April 8, 1969   R. PROCTER   3,436,942
KEYHOLDER
Filed Dec. 8, 1967
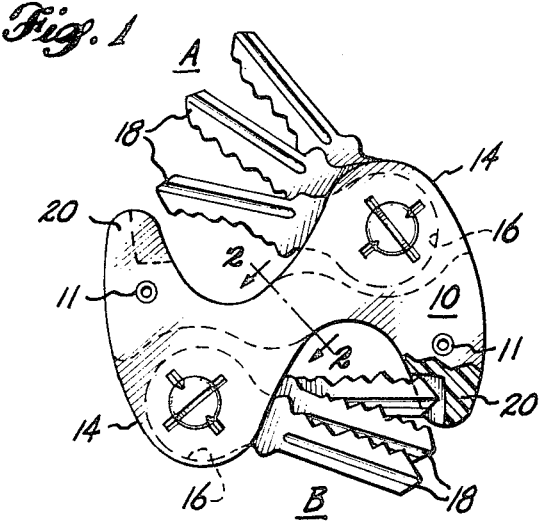
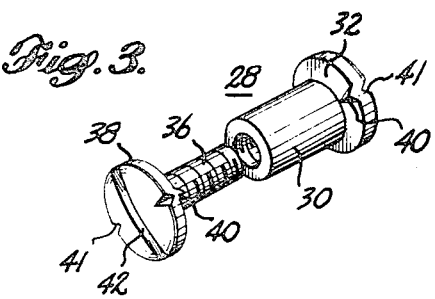
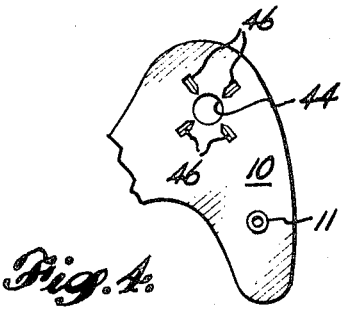
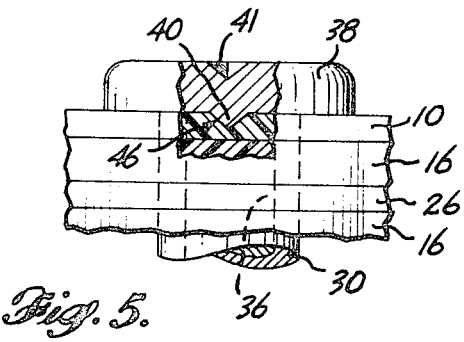
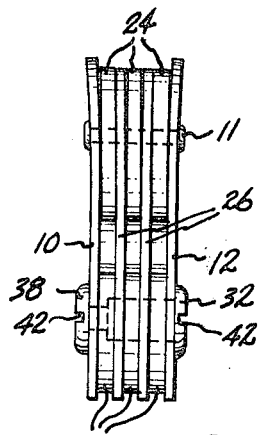
INVENTOR
ROBERT PROCTER
BY Ford E. Smith
ATTORNEY United States Patent Office 3,436,942
Patented Apr. 8, 1969

3,436,942
KEYHOLDER
Robert Procter, 1516 Burnaby St., Suite 290,
Vancouver, British Columbia, Canada
Filed Dec. 8, 1967, Ser. No. 689,055
Int. Cl. A45c *11/32*; A44b *15/00*; A47g *29/10*
U.S. Cl. 70—456         3 Claims

ABSTRACT OF THE DISCLOSURE

A keyholder for several keys is provided with interfitting means between flanged heads of a threaded fastener and adjacent cheek plates of the holder, said means being operable to resist torque tending to unscrew the fastener parts as the keys are swung out or into the holder.

Background

While numerous forms of keyholders in which the keys are retained between cheek plates by tubular threaded fastening means are known, it has been observed that as the keys are swung out of the holder and about the axis established by the fastening means, there is a tendency for the parts of the fastener to become unscrewed, thus loosening the keys so that they are not tightly retained in the holder or to such an extent that the parts become disassembled. This appears to be due to the application of torque applied to the fastener parts as a result of swinging motion of one or more of the keys. While it would appear that screw-loosening torque, caused by the key being swung out would be compensated when the key is swung back, such does not appear to be the case. It is believed that this failure of a compensating tightening action or torque to exist is due to the relatively greater force required to tighten the parts of the threaded fastener than it is to unscrew or loosen those parts.

It has been an important object of this invention to provide a keyholder so designed and adapted that the application of torque to the parts of a threaded fastener, tending to unscrew the same, is resisted; it being a further object of the invention to provide such torque-resisting function in a simply produced and easily used structure not materially complicating the manufacture of keyholders and one capable of being used with facility and satisfaction without requiring a high level of mechanical ability.

The drawings

FIGURE 1 is a plan view of a keyholder according to this invention;

FIGURE 2 is a cross section taken on line 2—2 of FIGURE 1;

FIGURE 3 is an exploded perspective view of a threaded fastener employed in this invention;

FIGURE 4 is a plan view of a portion of the check plate 10;

FIGURE 5 is an enlarged view of the head of a screw element showing its interfitting relationship with a cheek plate of the keyholder; and FIGURE 6 is an edge view of the keyholder of FIGURE 1, as from the right therein.

The invention

The keyholder comprises a pair of cheek plates 10 and 12 suitably formed of hard or horny material of which "Formica" and similar sheet material is a satisfactory source. In FIGURE 1 the keyholder is shown as somewhat S-shaped to accommodate two groups of keys A and B. The keyholder cheek plates are symmetrically shaped in a complementary fashion providing enlarged portions 14, 14 to receive the two groups of keys A and B, having their bows 16, 16 nested therein. The toothed key tangs or ends 18, 18 are cradled in notched horns 20, 20 of the holder. This encases the ends of the keys and avoids their protrusion in an objectionable manner in a person's pocket or purse.

Between the cheek plates 10 and 12 are spacers 24 of substantially the same thickness as the keys. These extend the full length of the keyholder but are cut away as shown in dotted lines in FIGURE 1 in the region of the key bows at portions 14, 14. Somewhat thinner spacers 26, 26 are interposed between the three spacers 24 and extend throughout the entire profile of the cheek plates 10 and 12. Spacers 24 are disposed between the bows 16 of the keys of both groups A and B, as shown in FIGURE 6. The spacers 26, as can be seen in FIGURE 6, may also be slightly thicker where they are disposed between the spacers 24, thus adding a slight flare to the keyholder as may be seen in end view FIGURE 6 to slightly relieve pressure on the keys fastened within the holder.

The threaded fastener 28 shown in FIGURE 3 comprises a tubular internally threaded sleeve 30 having a flanged head 32 with which mates the threaded stem of screw 36, also provided with a flanged head 38. As shown, the undersides of flanges 32 and 38 support bosses 40 which are part of the torque-resisting means to be more fully described. Both flange 32 and flange 38 may also have kerfs 42 to facilitate tightening or loosening of the parts of the screw fastener.

The formation of the bosses 40 may be simply attained by striking the external periphery of the flanges with a chisel-like tool, thereby forming a notch 41 on the outer surface and the corresponding boss 40 on the inner surface. Or in stamping or forging the parts of fastener 28 the bosses 40 may be simply produced as protuberances on the inner surfaces of the flanged ends of the screw fastener parts.

Each of the cheek plates 10 and 12 and the intervening spacers are desirably assembled and secured together by rivets or similar fastener 11 passing through all the juxtaposed parts.

The cheek plates and the intervening thinner spacers 26 are provided with holes 44 which are aligned to receive the parts of the screw fastener 28. The usual holes in the key bows 16 likewise align with holes 44. The two parts of the screw fastener are inserted therein and threadedly engaged to each other. Threaded rotation results in drawing the flanges 32 and 38 into juxtaposition against the outer faces of the cheek plates 10 and 12. Preferably, in radial fashion and surrounding the apertures 44 on the outer faces of the cheek plates 10 or 12 may be a plurality of sockets or recesses 46 which receive the bosses 40 or some of them. As the fastener parts 36 and 30 are drawn together by reason of the screw action and the flanged heads are drawn against the faces of the cheek plate, the bosses 40 fit into the recesses 46. When the assembly is suitably tight, this interfitting relationship serves to resist torque applied against the fastener parts as the keys may be swung out or swung in.

Preferably, the spacers 26 are formed of a lubricious material, of which sheet polyethylene is a specific example, the same being somewhat compressible and resilient. Such material is capable of permitting relatively free rotation of the key bow as one moves the notched tang 18 to swing the key out or to press it in to the holder. By reason of the use of such semi-compressible material, when the key is swung out, it will normally stay in the disposition attained. At the same time it can be easily swung out further to another position or returned to its nested position with ease. But such swing motion does not overcome the boss-and-socket interfit and the fastener does not loosen.

What is claimed is:
1. A keyholder, comprising:
   a pair of spaced apart cheek plates formed of a hard material, separated by at least a pair of keys between which are relatively compressible means;
   said cheek plates and keys being provided with aligned apertures to receive a screw fastener passing therethrough;
   said screw fastener comprising an internally threaded collar having a flange on one end, and a flanged screw adapted to mate in said collar, said collar and said screw being of such length that when mated in said aligned apertures, the flanges thereof are juxtaposed to the outer surfaces of said cheek plates; and
   interfitting torque-resisting means between each of said flanges and the adjacent surface of a cheek plate, said means being located peripherally of said flanges.

2. The structure according to claim 1 in which the interfitting means comprises at least one boss on the inner face of each flange and at least one socket on the outer face of each cheek plate.

3. The structure according to claim 1 in which the compressible means are lubricious spacer plates between the keys.

References Cited
UNITED STATES PATENTS

| 1,658,431 | 2/1928 | Dodson | 70—456 |
| 2,595,981 | 5/1952 | Prickett et al. | 70—456 |
| 3,354,679 | 11/1967 | Le Fave | 70—456 |

FOREIGN PATENTS 508,859  7/1939  Great Britain.

MARVIN A. CHAMPION, *Primary Examiner.*

R. L. WOLFE, *Assistant Examiner.*